Nov. 12, 1968     V. E. HAMILTON     3,410,208
METHOD AND MEANS FOR PRINTING AMBIENT LIGHT FILTERS
Filed Dec. 2, 1963     3 Sheets-Sheet 1
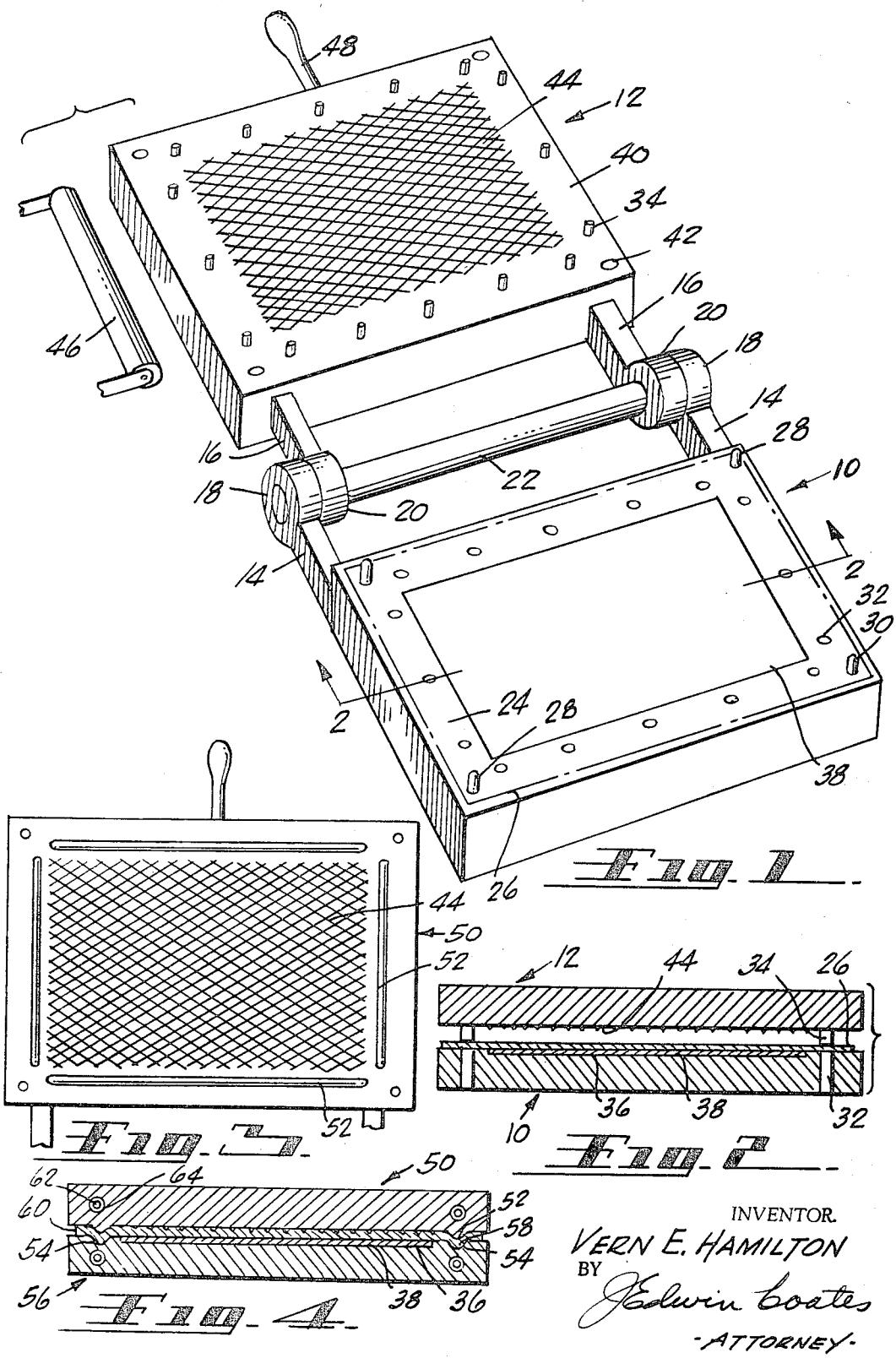
INVENTOR.
VERN E. HAMILTON
BY
J. Edwin Coates
-ATTORNEY-

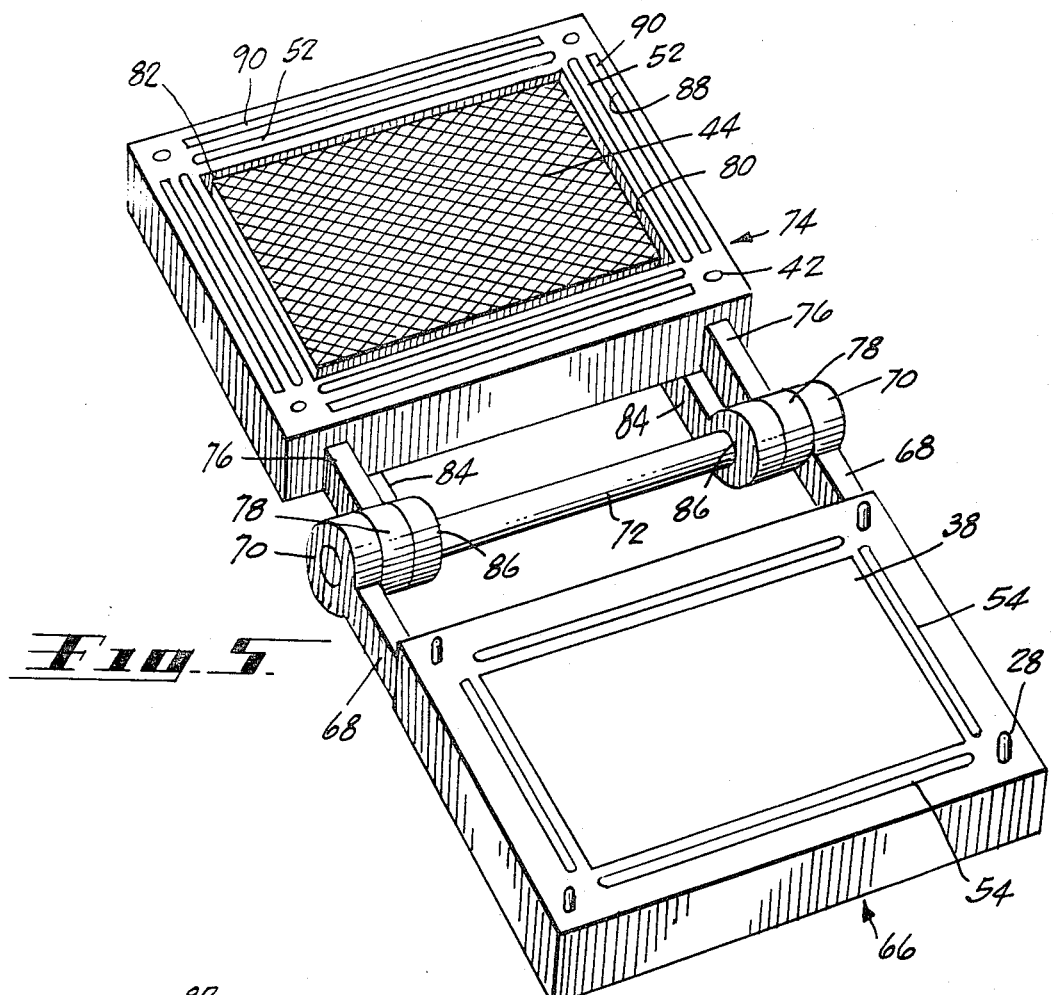
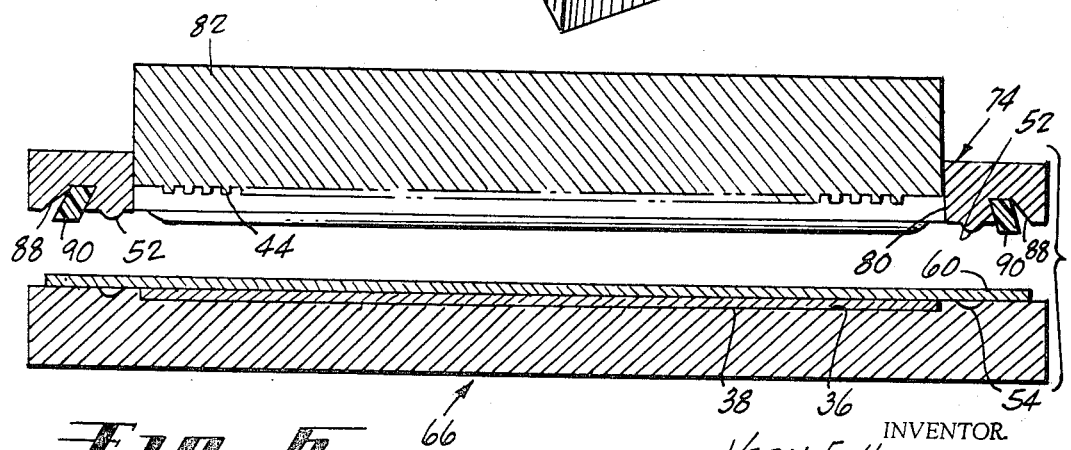

Nov. 12, 1968 V. E. HAMILTON 3,410,208
METHOD AND MEANS FOR PRINTING AMBIENT LIGHT FILTERS
Filed Dec. 2, 1963 3 Sheets-Sheet 3

INVENTOR.
VERN E. HAMILTON
BY Edwin Coates
ATTORNEY

United States Patent Office 3,410,208
Patented Nov. 12, 1968

3,410,208
METHOD AND MEANS FOR PRINTING AMBIENT LIGHT FILTERS
Vern E. Hamilton, Palos Verdes Estates, Calif., assignor, by mesne assignments, to McDonnell Douglas Corporation, Santa Monica, Calif., a corporation of Maryland
Filed Dec. 2, 1963, Ser. No. 327,474
17 Claims. (Cl. 101—316)

ABSTRACT OF THE DISCLOSURE

Apparatus to print grid pattern in perfect registry with index formations for laminating purposes includes planar backing member to receive sheet, index-forming means movable toward backing member to produce index formations and hold sheet during printing, and grid-printing means movable toward backing member in exact registry with index-forming means to print grid pattern in proper location. Grid-printing means may be part of carrier member for index-forming means or may move back and forth through opening in carrier member.

---

This invention relates to the production of space lattice type ambient light trapping filters and more particularly to apparatus and methods for producing components of such filters and laminating the components into completed filters on a production basis.

Cathode ray tubes are typical examples of diffuse radiant screens and are particularly susceptible to the effects of ambient light rays. When such rays strike the surface of a cathode ray tube at various angles they produce specular reflection off the glass or diffuse reflection off the phosphors or both. The more serious problem is the reflection off the phosphors because such reflection often illuminates the low lights to such extent as to confuse them with the highlights, thus degrading the contrast.

Various schemes have been proposed for overcoming this difficulty, such as hoods over the tubes and honeycomb cores located in front of the "screens," but such schemes have met with only minor succeess. My copending application for patent on Ambient Light Filter, Ser. No. 230,644, filed Oct. 15, 1962, discloses a novel construction which solves the problem.

Briefly, that novel construction comprises a filter body of transparent material in which are embedded a plurality of filter elements having a grid pattern. Each element constitutes a tier of alternating transparent highly light absorbing material in closely spaced relation to constitute a multiplicity of light transmitting apertures bordered by such light absorbing material. The grid pattern may be formed of generally parallel straight or wavy lines, or lines crossing each other to produce cells of varying shapes including but not limited to squares, rectangles and diamonds. The tiers are in generally parallel relation to each other and are spaced depthwise of the filter body with the light transmitting apertures in registry to constitute depthwise directed viewing cells. The axes of the cells may be normal to the plane of the filter body or at some other preselected angle.

Ambient light rays striking the surface of the filter body at acute angles other than normal are refracted into the cells at an angle, striking one or another of the depthwise spaced lines of light absorbing material and are absorbed thereby. The success of such filter results from the fact that the cells are very small in at least one lateral dimension and the lines forming the cell boundaries are extremely thin in the depthwise direction so that their edges present no appreciable grazing surface to reflect light rays onwardly. In fact, in a typical example the width of the apertures may be from .006 to .030 inch and the line width from .002 to .010 inch. The line thickness may vary from .0001 to .0002 inch, or even thinner, and the depthwise spacing between lines may be of the order of .010 inch or less. Such a filter with six filter elements is only one sixteenth inch thick.

It will be readily appreciated that the manufacture of a filter of this type presents a very difficult problem, particularly with respect to the registry of the apertures in the several tiers. The separate layers bearing the filter elements, as disclosed in the prior application, must be very finely adjusted and then held in adjusted position until they are firmly cemented. Because of the narrowness of the lines and of the spaces between them, a misregistry of lines in succeeding tiers of more than two or three ten-thousandths of an inch cannot be tolerated, and registration within one ten thousandth of an inch is the desirable tolerance limit.

These problems are greatly simplified by the use of the present invention which provides a means and method for relatively high speed production of such filters having collimated viewing cells directed substantially normal to the plane of the filter. A slight modification of the apparatus makes it possible to produce filter bodies in which the axes of the viewing cells are directed at a substantial angle to the normal.

The base material used in the practice of the invention is an elongate continuous web of transparent plastic material of any desired thickness, depending on the specific design of the filter, usually of the order of .010 inch or less. Suitable materials are cellulose acetate and ethyl cellulose. Other materials having suitable transparency and flexibility may be substituted. The end product is a laminate of two or more sheets of this material severed from the web and permanently laminated to each other with a suitable transparent cement, each layer or sheet having an identical grid pattern thereon and the patterns being in predetermined depthwise registry to produce depthwise directed viewing cells.

In general, the method comprises gripping a length of the material mentioned above, which may be severed from the continuous web before processing or afterward, and holding it immobile while producing a plurality of index formations in a desired arrangement. These may be punched holes, or dimples as disclosed in my copending application, Ser. No. 288,106, filed June 17, 1963, or narrow elongate beads deformed out of the plane of the material. While the length or sheet of material is still being held immobile, a suitable grid pattern is printed on one or both faces of the sheet. These three steps are perfomed substantially sumultaneously although taking place in the order mentioned above. The gripping of the marginal edges should become firm before or at the same time the index deformation occurs, and the deformation should be complete before or at the same time the printing occurs.

Since the index formations and the printed grid pattern are produced while the sheet is being held immobile and the printing device is always in exaclty the same registry relation with the index deforming means during printing, it is obvious that every sheet processed will be exactly the same, and when several sheets are laid up with their index formations in proper registry the grid patterns will likewise be in proper registry and the space lattice will be collimated. The index formations may be tilted to any desired degree so that the axes of the viewing cells in the laminate will be correspondingly sloped.

One preferred form of apparatus for making the filters include a pair of processing members relatively movable toward and away from each other to grip a sheet of material between them. The members may be block-like or plate-like but in any event they have marginal face portions which are generally planar and which are parallel to each other in juxtaposition when the members are closed so that the marginal face portions will firmly grip the sheet during the accompanying operations. In most cases the members are substantially rectangular in planform and are provided with index-forming means such as pins in one member and corresponding recesses in the other. The pins may be punch pins to form locating holes or blunt pins to form dimples. They may also be elongate beads to form corresponding concavo-convex beads in the sheet.

The index-forming means are located along at least one margin and preferably all four margins of the members. With this arrangement the sheet becomes firmly gripped as the deformation is completed. In a modification, elastomeric strips are inserted in suitable recesses in the margins of one of the members outside the pattern of the index-forming means and extend slightly from the face of the member. They are mounted at a slant so that as they encounter the sheet they urge its margins away from each other to spread it into a smooth, flat form. The sheet is punched or indented while being so held, thus avoiding any wrinkles or waviness in the central portion of the sheet. If the sheet is to be indented, the index-forming portions of the processing members may be locally heated to flow the sheet material and avoid spring-back.

In one form of the invention the grid-printing means is mounted on or forms a part of the front face of one of the processing members and is substantially flush with the surface of the marginal portions. With this arrangement the index-forming means will engage the sheet first and will bottom at the same time as the printing takes place. Consequently, the formations are completed and the sheet is being firmly held when the actual printing takes place. Since the deforming and printing parts are unitary there can be no variation in registry relation from sheet to sheet.

In a modification, one of the processing members may be in the form of a rectangular frame which carries the index-forming means and has a rectangular opening within the pattern of the index-forming means. The printing means is then mounted to move separately within or through the opening in the frame along a predetermined path which corresponds with the path of the processing members. When this construction is used the forming is completed first, and then the printing means moves into engagement with the sheet. This avoids any possibility of deformation or strain taking place in the sheet during the printing phase. Very accurate zero-clearance guide means are used so that the printing means will be in exactly the same registry relation with the index-forming means in every cycle of operation.

When a plurality of sheets processed as described above are laid up into a laminate to be cemented together they are automatically collimated by mechanically aligning the index formations and no visual or optical alignment is required. The punched sheets are set on a base board having properly located guide pins. The indented sheets are aligned by merely nesting the protuberances and recesses of adjacent sheets. In either case the laminate is then placed in a press which urges the sheets tightly together and forces out excess cement.

Various other advantages and features of novelty will become apparent as the description proceeds in conjunction with the accompanying drawings, in which:

FIGURE 1 is a perspective view of a pair of processing members adapted to grip a sheet of material, produce index formations therein, and print a grid pattern in predetermined registry relation with the index-formations;

FIGURE 2 is a sectional view taken on line 2—2 of FIGURE 1 showing the relation of parts at the moment processing begins;

FIGURE 3 is a plan view of the working face of a modified processing member;

FIGURE 4 is a sectional view of the modified form, similar to FIGURE 2;

FIGURE 5 is a perspective view, similar to FIGURE 1, showing further modification of the invention;

FIGURE 6 is a sectional view in elevation through the processing members of FIGURE 5 just before processing begins;

Figure 7:
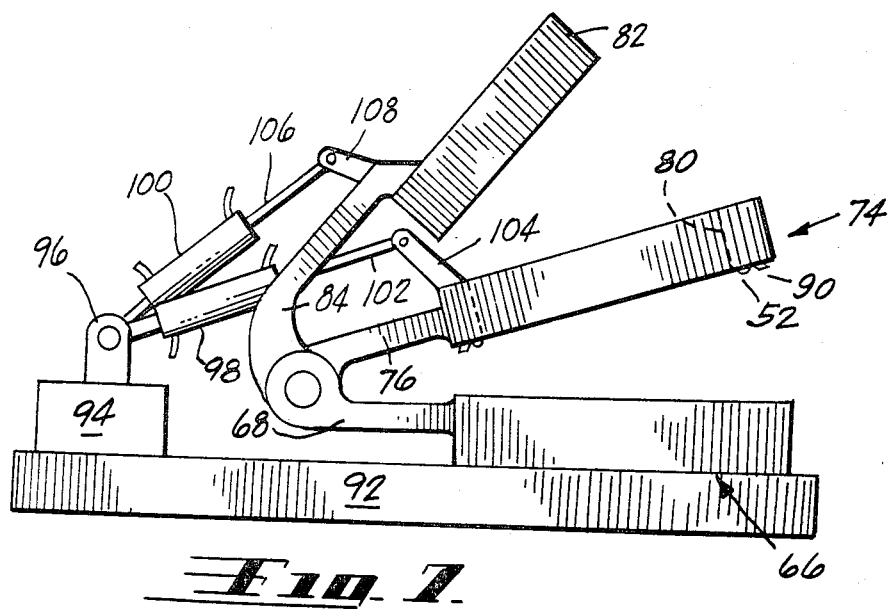
FIGURE 7 is a side elevational view of an apparatus embodying the processing members of FIGURE 5.

In the form of the invention disclosed in FIGURE 1 the apparatus generally comprises a pair of processing members 10 and 12 arranged for relative movement toward and away from each other along a predetermined path to insure exactly the same registry in each closing operation. Both members may be movable, or one member may be movable and the other one fixed. They may be mounted on slides or tracks or guide pins but preferably they have a pivotal mounting, which may be merely the connection between them or it may be the support for the movable parts of the apparatus. As shown, members 10 and 12 have arms 14 and 16 extending from a lateral edge of each, and these arms are provided with pivot bearing ends 18 and 20 mounted on the pivot axle 22. Both sets of arms may pivot on axle 22 or one set may be fixed to it. Simple friction bearings are shown for simplicity but in practice anti-friction bearings are used which are preloaded so as to allow substantially zero radial and axial movement to insure registry.

Member 10 is block-like and has, at least at the margins, a generally planar front face 24 adapted to engage the margins of one face sheet 26, shown in phantom lnes, of the thin, flexible, transparent material to be processed. Preliminary guide pins 28 are arranged at the corners of member 10 and engage slightly oversize holes 30 in the sheet to locate the sheet accurately enough for the subsequent processing without the delay involved in exact fitting of the pins to the holes. These holes 30 are later engaged by conveyor hooks to support the sheet in the ink-drying stage. A plurality of punch holes or recesses 32 are arranged in a rectangular pattern around the margin of member 10 for cooperation with punch pins 34 in member 12 to produce a plurality of index formations in the sheet. While the entire front face may be flat, it is disclosed as having a shallow recess 36, FIGURE 2, in which is mounted a thin pad of material 38 which is very firm but slightly elastic. Pad 38 is substantially flush with the marginal face of member 10, preferably extending out a very slight distance. Since member 10 normally remains stationary it may be considered as a backing plate or backing member, with member 12 swinging toward and away from it to accomplish the purposes of the invention.

Punch pins 34 are mounted at the front face 40 of member 12 in an exact complementary fashion to recesses 32 so that, when the members are closed, the pins and recesses will punch very accurately arranged and very accurately sized holes in the plastic sheet. Holes 42 are provided in member 12 to provide adequate clearance for the preliminary guide pins 28 in member 10. All of the central portion of the front face 40 is occupied by the grid-printing formation 44, here shown as having a diamond grid pattern flush with the remainder of the front face. Since it is made unitary with member 12 it is always in exactly the same registry relation with punch pins 34, and therefore every sheet which is processed will be identical. Although the plastic sheets are very smooth and quite uniform, there is still a small percentage variation in thickness throughout the area. If the printing plate and backing plate are both very hard and flat there will be areas of the sheet which will fail to be printed. Pad 38, being slightly resilient, will push up against all parts of the sheet during printing and insure that no gaps occur on the printing side during the printing operation. This system will insure complete printing of the grid with a conventional type of printing plate if the grid pattern is open, such as multiple, straight, parallel lines, because no air will be trapped. In the case of closed patterns, such as diamonds, hexagons, or rectangles, the backing plate must be porous so that air trapped in any area of the plate can escape through its thickness and allow every part of the sheet to contact the appropriate portion of the printing grid. The desired number of sheets can be mounted on a base board having guide pins in a duplicate pattern with the assurance that the resulting viewing cells between the grid lines will be properly collimated.

If it is desired that the axes of the viewing cells be at some angle other than normal to the plane of the laminated filter, the punch pins and punch holes are correspondingly sloped. In this case the punch pins may be movable, being retained within the body of member 12 until the apparatus is closed, and then extended to pass through the sheet. Alternatively, if it is desired to retain the mechanical simplicity of the fixed pins, the axis of the hinges may be offset from the plane of the printing faces a suitable distance. Preferably it is located in a plane which extends normal to the axes of the fixed punch pins and intersects the printing plane midway between the pins nearest to the hinge and those farthest removed therefrom.

The grid-printing means 44 may be inked in any desired way, manually or mechanically, by an inking roller 46. The apparatus as shown is manual, and a suitable handle 48 is provided to manipulate member 12.

A modified form of plate 12 is illustrated in FIGURE 3 and is designated 50. Instead of punch pins the front face of plate 50 is provided with a plurality of narrow, elongate beads 52 having rounded ends and arranged in the form of a rectangle around the grid-printing means 44. Corresponding recesses 54 are provided in the lower plate 56, FIGURE 4, and cooperate to impress beads 58 in the plastic sheet 60. In order to make the plastic flow and form a permanent bead, localized heat is applied to the bead forming portions of both plates by providing heating units 62 in passages 64. The use of these elongate beads in picture frame form provides a maximum directive effect in aligning the various layers in a laminate.

The index formations may also take the form of dimples as outlined in detail in my co-pending patent application, Ser. No. 288,106, filed June 17, 1963. That application also discloses a manner of offsetting the sheets in a laminate to slope the axes of the viewing cells by tilting the axes of the dimples and the same principle can be applied in the formation of the beads in FIGURES 3 and 4.

A further modification of the invention is illustrated in FIGURES 5, 6, and 7, in which the lower plate or backing member 66 is substantially identical to plate 56 of FIGURE 4, having the same bead recesses 54 and central pad 38. It also has the preliminary guide pins 28 of FIGURE 1. As in the case of FIGURE 1, plate 66 has a pair of arms 68 extending from one margin, with bearing ends 70 mounted on axle 72. The upper plate 74 has arms 76 extending from one margin, with bearing ends 78 mounted on axle 72. Both sets may be free on the axle or one may be fixed to it. In any event no radial or end play is allowed.

In this modification it will be noted that member 74 is in the form of a rectangular frame with an opening 80 therethrough from front to back. The grid-printing means 44 is formed as the front face of printing plate or block 82 which is movable in and through opening 80 to engage the sheet. Plate 82 is also provided with a pair of arms 84 having bearing ends 86 mounted on axle 72. They may be fixed or rotatable on the axle depending on the arrangements of the other arms, but are not allowed any radial or end play. Consequently the grid printing means 44 will always be in exactly the same registry relation with the index forming means when it is in printing position.

Plate 74 is provided with the same index-forming beads 52 as plate 50 of FIGURE 3. In addition, as best seen in FIGURE 6, it is provided with elongate recesses 88 along its margins outside the beads 52. These recesses are angled outwardly and are enlarged adjacent the face of the plate to provide clearance for the strips 90 of elastomeric material seated in the recesses. When the plates are closed on sheet 60, the rubber-like strips will bend outwardly toward the margins and urge the sheet outwardly, spreading it to make it smooth and flat. Continued closing movement will bulge the strips into the clearance in recesses 88, and beads 52 will engage the sheet and force it into recesses 54 to form index beads as in the modification of FIGURES 3 and 4. Plate 82 then moves forward to engage and print the sheet while it is being held immobile.

The operation may be manual or as automatic as desired. A simple semi-automatic arrangement is schematically illustrated in FIGURE 7, where plate 66 is mounted on base 92. An anchor block 94 is mounted on the base and provided with trunnions 96 to pivotally mount the ends of servo motors 98 and 100. Shaft 102 of servo motor 98 is pivotally connected to horn 104 extending from plate 74 and operates, when actuated, to bring plate 74 down into gripping and forming engagement with a plastic sheet. Similarly, shaft 106 of servo motor 100 is pivotally connected to horn 108 extending from plate 82 and operates, when actuated, to bring plate 82 down into printing engagement with a plastic sheet. It will be seen that, with the apparatus just described, the sheet will be sequentially gripped and spread smooth and flat, then provided with index formations, and then imprinted while being held immobile so that perfect registry relation between grid pattern and index formations is attained. By proper programming and design, the sequence can be made as close to simultaneous as desired.

Frame member 74 can be modified to operate in the same general manner as a double acting die if desired. This can be accomplished by dividing it into two coaxial frame members, one of which has a surface adapted to grip the sheet, and the other of which is provided with bead forming means. They are spring loaded apart so that the gripping frame reaches the sheet first. The direct closing force is applied to the beading frame and through it to the gripping frame so that the latter is resiliently urged against the sheet, and continued movement of the beading frame will increase the gripping engagement and finally result in contact of the bead forming means with the sheet. It will be apparent that the sheet will be firmly held against any lateral movement in its plane while the beading is being accomplished.

The invention is illustrated as applied to the processing of individual sheets. However, it works equally well with a continuous web fed from a roll located near the apparatus, successive lengths or portions being fed into the apparatus, processed, and moved onwardly in steps, and being severed after leaving the apparatus.

Figure 8:
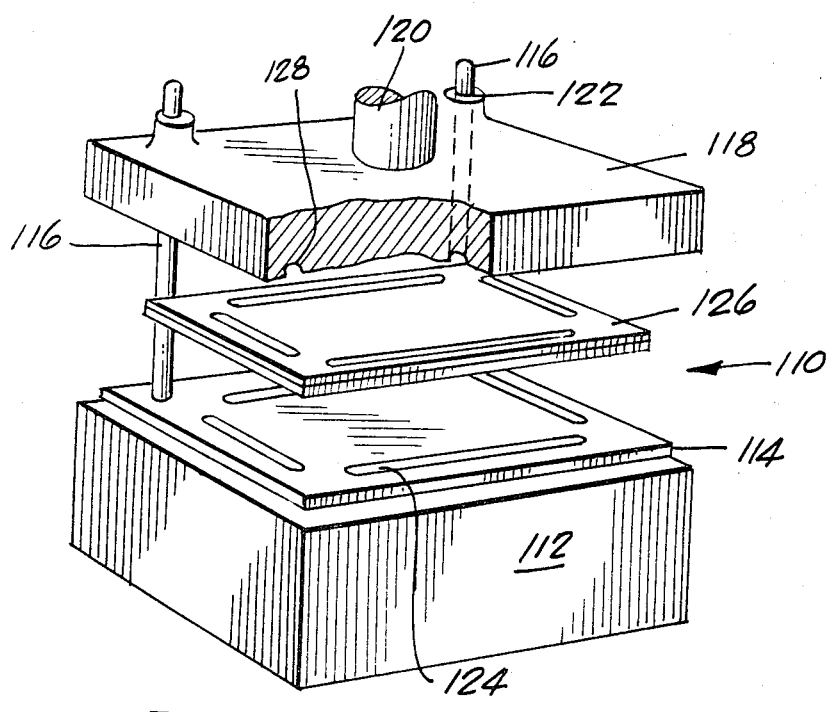
FIGURE 8 is a fragmentary perspective view of a suitable laminating press for use with the processing apparatus.

The process of making a filter is completed by laying up the desired number of formed and printed sheets with cement between them and with the index formations in registry. The laminate is now transferred to the press 110, FIGURE 8, for bonding, the press being shown as arranged to accommodate the bead type index formations. The press includes a platform 112 on which is mounted a base plate 114. Guide pins 116 extend through the base plate into the platform and extend upwardly in parallel spaced relation. Pressure plate 118 is carried by piston rod 120 which is actuated by a conventional ram, not shown, to move the pressure plate toward and away from the base plate. The pressure plate is provided with guide apertures 122 slidably fitting guide pins 116 to maintain the pressure plate in exact alignment with the base plate at all times.

Base plate 114 is provided with a plurality of narrow, elongate beads 124 which are located to align exactly with the concavo-convex beads in the laminate 126 and pressure plate 118 is provided with matching recesses 128. The laminate is laid on the base plate with the recessed side of its bottom bead engaging beads 124. The pressure plate is now lowered by the ram until the recesses 128 seat on the protruding side of the top bead of the laminate. Plate 118 is pressed firmly against the laminate and the sheets are squeezed tightly together. In those cases where the axes of the beads have been sloped to produce viewing cells at an angle other than normal to the plane of the sheet, it is desirable to apply pressure along the axes of the beads to avoid possible lateral dislocation and misregistry during cementing. This is accomplished by setting the guide pins 116 at substantially the same angle as the sloping axes of the beads. All air is expelled from between them and any excess cement is also squeezed out. Since the beads will prevent lateral slippage of the sheets, it is possible to take the laminate out of the press immediately and store it elsewhere while the cement is curing.

It will be apparent to those skilled in the art that various changes and modifications may be made in the construction and arrangement of parts without departing from the spirit of the invention and it is intended that all such changes and modifications shall be embraced within the scope of the following claims.

I claim:

1. Apparatus for indexing a sheet of material and printing a grid pattern thereon in exact registry relation with the index formations therein, comprising: a pair of processing members relatively movable toward and away from each other along a predetermined path to insure consistent registry; a first one of said members having a generally planar and rectangular front face; the second one of said members being in the form of a generally rectangular open frame having a generally planar front face adapted to be brought into parallel juxtaposition with the front face said first member upon closing movement of said members; independent means to produce said relative movement and hold said members in closed position to positivly grip a sheet between their margins; said members having cooperating index-forming means along their margins to engage said sheet and produce therein a marginal pattern of index formations; and grid-printing means relatively movable toward and away from the front face of said first member to engage said sheet and produce thereon a representation of a desired grid pattern; said grid-printing means being provided with control means independent of said processing members to cause it to move back and forth in the opening in said second member along a predetermined path with respect to said members while said members positively grip said sheet to maintain the printing pattern of the grid-printing means always in the same registry relation to the index-forming means when in printing position; said index-forming means and the marginal portions of said members restraining said sheet against any lateral shifting during the printing phase.

2. Apparatus as claimed in claim 1; and yieldable means located along the marginal portions of one of said members and arranged to preliminarily engage said sheet and spread it into smooth, flat form prior to engagement of the sheet by the index-forming means and the grid-printing means.

3. Apparatus for indexing a sheet of material and printing a grid pattern thereon in exact registry relation with the index formations therein, comprising: a pair of processing members relatively movable toward and away from each other along a predetermined path to insure consistent registry; said members having generally planar and rectangular front faces adapted to be brought into parallel juxtaposition to grip a sheet between them; said members having cooperating index-forming means along their margins to engage said sheet and produce therein a marginal pattern of index formations; and grid-printing means substantially flush with the front face of one of said members and within the marginal pattern of index-forming means adapted to engage said sheet and produce thereon a representation of a desired grid pattern; said index-forming means being arranged to engage said sheet and produce the index formations prior to engagement of the sheet by the grid-printing means; the pattern of said grid-printing means being always in the same registry relation to the index-forming means when in printing position; and said index-forming means and the marginal portions of said members restraining said sheet against any lateral shifting during the printing phase.

4. Apparatus as claimed in claim 3; and yieldable means located along the marginal portions of one of said members and arranged to preliminarily engage said sheet and spread it into smooth, flat form prior to engagement of the sheet by the index-forming means and the grid-printing means.

5. Apparatus for indexing a sheet of material and printing a grid pattern thereon in exact registry relation with the index formations therein, comprising: a pair of processing members relatively movable toward and away from each other and provided with generally planar portions adapted to confront each other in parallel relation and grip between them at least the margins of a sheet of material to be processed; a plurality of protuberances on the face of one member along at least one margin thereof; a plurality of corresponding recesses in the face of the other member in exact registry with said protuberances; the recesses and protuberances cooperating to produce index formations in at least one margin of a sheet gripped between said members; and grid-printing means movable toward and away from at least one of said members to engage said sheet and produce thereon a representation of a desired grid pattern; said protuberances being arranged to engage said sheet and produce the index formation prior to engagement of the sheet by the grid-printing means; the pattern of said grid-printing means being always in the same registry relation to the protuberances and recesses when the grid-printing means is in printing position.

6. Apparatus as claimed in claim 5; a shallow recess in the face of said one member opposite said grid-printing means; and a thin, flat, resilient pad in said recess to cooperate with said grid-printing means to press said sheet against all portions of said grid-printing means.

7. Apparatus for indexing a sheet of material and printing a grid pattern thereon in exact registry relation with the index formations therein, comprising: a pair of processing members relatively movable toward and away from each other and provided with generally planar portions adapted to confront each other in parallel relation and grip between them at least the margins of a sheet of material to be processed; means carried by said members to produce a plurality of index formations in said sheet; and grid-printing means movable toward and away from at least one of said members to engage said sheet and produce thereon a representation of a desired grid pattern; said index-forming means being arranged to engage said sheet and produce the index formations prior to engagement of the sheet by the grid-printing means; the pattern of said grid-printing means being always in the same registry relation to the means for producing index formations when the grid-printing means is in printing position.

8. Apparatus as claimed in claim 7; said members having support arms extending laterally from a marginal edge; a pivot axle; and said arms being pivotally mounted on said axle to constrain said members to relative movement along a predetermined path to insure consistent registry.

9. Apparatus as claimed in claim 7; said means to produce index formations comprising protuberances carried by one member and matching recesses carried by the other member and being in the form of narrow elongate beads rectangularly arranged to produce in said sheet a plurality of narrow elongate concavo-convex beads arranged to form the sides of a rectangle around the printed portion of the sheet.

10. Apparatus for producing a filter element adapted to register substantially perfectly with like filter elements in laminar relation in the manufacture of space lattice type ambient light trapping filters, comprising: a backing member having a generally planar face to receive a length of thin, flexible, transparent material to be processed; index-forming means movable toward said backing member and said material to engage said material and produce permanent index formations therein; and grid-printing means movable toward said backing member and said material to engage said material and produce thereon a representation of a suitable grid pattern; said index-forming means being arranged to engage said sheet and produce the index formations prior to engagement of the sheet by the grid-printing means; the pattern of said grid-printing means being always in identical registry relation to the index-forming means; and the latter being in engagement with the material during the printing phase to prevent shifting of the material in its general plane; whereby the grid pattern on each filter element will be produced in exactly the same registry relation to its respective indexing formations to facilitate exact registry of the grid patterns of the filter elements during lamination.

11. A method of indexing a sheet of material and printing a grid pattern thereon in exact registry relation with the index formations therein, comprising the steps of: gripping a sheet of material and holding it stationary while producing a pattern of permanent index formations therein; printing and thereafter a desired grid pattern on said sheet in exact, predetermined registry relation with the index formations; and restraining said sheet against any lateral shifting from its index-forming position during the printing phase.

12. A method of indexing a sheet of material and printing a grid pattern thereon which is in exact registry relation with the index formations therein, comprising: gripping a sheet of material and holding it stationary against any lateral shifting from a predetermined position; and printing a desired grid pattern on said sheet and forming permanent index formations therein substantially simultaneously while said sheet is being held stationary; said grid pattern being produced in exact, predetermined registry relation with said index formations.

13. A method of indexing a sheet of material and printing a grid pattern thereon in exact registry relation with the index formations therein, comprising the steps of: gripping the margins of a sheet of material and urging them outwardly away from each other to spread the sheet into smooth flat form; retaining said sheet in its spread condition and producing a plurality of permanent index formations therein; and printing a desired grid pattern on said sheet in exact, predetermined registry relation with the index formations while restraining said sheet against any lateral shifting from its index-forming position during the printing phase.

14. Apparatus for indexing a sheet of material and printing a grid pattern thereon in exact registry relation with the index formations therein, comprising: a backing member having a generally planar face to receive a sheet of material to be processed; a plurality of marginal guide pins extending outwardly from said planar face to engage corresponding apertures in the sheet to initially locate the sheet in the desired position; index-forming means movable toward said backing member and said sheet to engage said sheet and produce permanent index formations therein; and grid-printing means movable toward said backing member and said sheet to engage said sheet and produce thereon a representation of a suitable grid pattern; the index-forming means being arranged to engage said sheet and produce said index formations prior to engagement of the sheet by the grid-printing means; the pattern of the grid-printing means being always in identical registry relation to the index-forming means when in printing position; the index-forming means engaging said sheet and restraining it against shifting in its general plane during the printing phase; whereby the grid pattern on each sheet will be produced in exactly the same registry relation to its respective indexing formations to facilitate exact registry of the grid patterns on a plurality of sheets made up into a laminate.

15. Apparatus as claimed in claim 14; including a carrier member movable toward and away from said backing member along a predetermined path to insure consistent registry; said index-forming means being carried by said carrier member and arranged along its margins in a framelike pattern.

16. Apparatus as claimed in claim 15; said grid-printing means being carried by said carrier member and arranged within the pattern formed by said index-forming means.

17. Apparatus as claimed in claim 15; said carrier member being in the form of a generally planar frame having a central opening therethrough; said grid-printing means being movable back and forth in said opening along a predetermined path with respect to said members to maintain its printing pattern always in the same registry relation to the index-forming means when in printing position.

References Cited

UNITED STATES PATENTS

| | | | |
|---|---|---|---|
| 4,838 | 11/1846 | McKinzie | 101—297 |
| 151,827 | 6/1874 | Bement | 101—296 X |
| 511,410 | 12/1893 | Cowdery | 101—30 X |
| 1,113,544 | 10/1914 | Cook | 101—30 X |
| 1,269,687 | 6/1918 | Dittman | 101—412 |
| 1,611,873 | 12/1926 | Beatty | 101—296 |
| 1,731,376 | 10/1929 | Goodstein | 101—296 X |
| 1,862,091 | 6/1932 | Kaplan | 101—31 |
| 2,005,340 | 6/1935 | Juffin et al. | 101—28 |
| 2,093,099 | 6/1937 | Rosenberg | 101—28 |
| 2,125,494 | 8/1938 | Freeman | 101—30 |
| 3,244,093 | 4/1966 | Vasilantone | 101—120 |

WILLIAM B. PENN, *Primary Examiner.*